United States Patent
Tran et al.

(10) Patent No.: US 7,305,020 B2
(45) Date of Patent: Dec. 4, 2007

(54) METHOD AND SYSTEM OF REDUCING ELECTROMAGNETIC INTERFERENCE EMISSIONS

(75) Inventors: Thanh T. Tran, Houston, TX (US); Ce Liu, Sugar Land, TX (US); Kenneth W. Egan, Austin, TX (US)

(73) Assignee: VizionWare, Inc., Austin, TX (US)

( * ) Notice: Subject to any disclaimer, the term of this patent is extended or adjusted under 35 U.S.C. 154(b) by 837 days.

(21) Appl. No.: 10/357,255

(22) Filed: Feb. 3, 2003

(65) Prior Publication Data
US 2004/0001533 A1    Jan. 1, 2004

Related U.S. Application Data

(60) Provisional application No. 60/383,455, filed on May 25, 2002, provisional application No. 60/365,330, filed on Mar. 18, 2002, provisional application No. 60/365,348, filed on Mar. 18, 2002, provisional application No. 60/354,234, filed on Feb. 4, 2002.

(51) Int. Cl.
*H04B 1/69* (2006.01)
(52) U.S. Cl. .................................................... 375/130

(58) Field of Classification Search ................ 375/130, 375/257, 140–147
See application file for complete search history.

(56) References Cited

U.S. PATENT DOCUMENTS

| | | | |
|---|---|---|---|
| 4,392,220 A | * | 7/1983 | Hirosaki et al. ............ 370/479 |
| 4,888,788 A | | 12/1989 | Teranishi et al. |
| 5,093,841 A | | 3/1992 | Vancraeynest |
| 5,128,957 A | | 7/1992 | Nakagawa |
| 5,148,447 A | | 9/1992 | Ito |

(Continued)

FOREIGN PATENT DOCUMENTS

| EP | 0823801 A2 | 11/1998 |
|---|---|---|
| TW | 223 505 B | 11/2004 |

OTHER PUBLICATIONS

PCI Express (TM) Base Specification Revision 1.0a, PCI-SIG, Apr. 15, 2003, pp. 1-428.

(Continued)

*Primary Examiner*—Don N. Vo

(57) ABSTRACT

A method and system is disclosed for spreading the power associated with digital signals being transmitted to lower electromagnetic interference (EMI) emissions. After being transmitted across a transmission line, a representation of the original digital signal is recovered and provided to a destination device.

18 Claims, 11 Drawing Sheets

U.S. PATENT DOCUMENTS

| | | |
|---|---|---|
| 5,177,766 A | 1/1993 | Holland et al. |
| 5,263,055 A | 11/1993 | Cahill |
| 5,416,434 A | 5/1995 | Kootstra et al. |
| 5,692,006 A | 11/1997 | Ross |
| 5,872,807 A | 2/1999 | Booth et al. |
| 5,963,584 A | 10/1999 | Boulanger et al. |
| 6,020,939 A | 2/2000 | Rindal et al. |
| 6,072,994 A | 6/2000 | Phillips et al. |
| 6,169,889 B1 | 1/2001 | Servilio et al. |
| 6,256,337 B1 | 7/2001 | Hendrickson et al. |
| 6,259,723 B1 * | 7/2001 | Miyashita .................. 375/141 |
| 6,292,507 B1 | 9/2001 | Hardin et al. |
| 6,345,073 B1 | 2/2002 | Curry et al. |
| 6,404,260 B1 | 6/2002 | Cruz-Albrecht |
| 6,426,977 B1 | 7/2002 | Lee et al. |
| 6,501,307 B1 | 12/2002 | Yen |
| 6,687,319 B1 | 2/2004 | Perino et al. |
| 6,687,322 B1 * | 2/2004 | Zhang et al. ............... 375/376 |
| 2003/0118080 A1 | 6/2003 | Hailey |
| 2003/0169838 A1 | 9/2003 | Greenstreet |
| 2004/0247027 A1 | 12/2004 | Wang |

OTHER PUBLICATIONS

Satoshi Nagai et al., "A Novel Full Bridge Type Novel Delta-Sigma Modulated Power Factor Correction Converter Applying Pulse Space Modulation Technique," 2001 IEEE, Pusan, Korea, pp. 1077-1082, Feb. 2001.

D. A. Stone and B. Chambers, "Effect of spread-spectrum modulation of switched mode power converter PWM carrier frequencies on conducted EMI," Electronics Letters, vol. 31, No. 10, pp. 769-770, May 11, 1995.

K K. Tse et al., "Analysis and Spectral Characteristics of a Spread-Spectrum Technique for Conducted EMI Suppression," 2000 IEEE Transactions on Power ELectronics, vol. 15, No. 2, pp. 399-410, Mar. 2000.

* cited by examiner

METHOD AND SYSTEM OF REDUCING ELECTROMAGNETIC INTERFERENCE EMISSIONS

CROSS-REFERENCE TO RELATED APPLICATION(S)

This application claims priority to the following provisional applications: U.S. Patent Application Ser. No. 60/354,234 filed on Feb. 4, 2002, entitled "CLOCK DISTRIBUTION METHOD WITH PROGRAMMABLE RADIATED EMISSIONS REDUCTION"; U.S. Patent Application Ser. No. 60/365,330 filed on Mar. 18, 2002, entitled "GATED DIRECT SEQUENCE SPREAD SPECTRUM CLOCK RECEIVER DESIGN"; U.S. Patent Application Ser. No. 60/365,348, filed on Mar. 18, 2002, entitled "GATED PSEUDO-RANDOM (GPN) GENERATOR FOR CLOCK DISTRIBUTION APPLICATION"; and U.S. Patent Application Ser. No. 60/383,455, filed on May 25, 2002 entitled "GATED DIRECT SEQUENCE SPREAD SPECTRUM CLOCK DISTRIBUTION SYSTEM AND METHOD FOR USING SAME".

BACKGROUND

1. Field of the Invention

The present invention relates to the general field of electromagnetic interference and radiated emissions, and more particularly to electromagnetic and radiated emission reduction techniques.

2. Description of the Related Art

Increasingly, clock distribution has become an important issue in the design of computers, communication devices, and advanced entertainment systems as higher performance features/faster microprocessors are integrated into these systems. These enhancements typically require incorporating higher frequency clock oscillators, as the clock speed is directly proportional to the speed of the microprocessor processing the information. However, devices supporting high speed clock and data paths are susceptible to internal and external radiation problems. For example, computer, telecommunication, and entertainment systems have sensitive audio, video, and graphics circuitries, the performance of which can be affected by internal EMI radiation. Furthermore, excessive internal EMI radiation degrades the quality of video, audio, and graphics, and causes system timing errors. EMI concerns in external devices having high clock and data rates raise FCC (U.S. Federal Communication Commission) compliance issue problems, as these systems and devices often have electromagnetic interference (EMI) requirements.

In general, to keep radiated EMI levels to a desired level, for FCC purposes or internal considerations, computer system designers typically employ techniques such as slowing down the clock, controlling rising and falling edges, utilizing the method of Spread Spectrum Clock Generation (SSCG), and/or shielding. While each of these EMI reduction techniques is effective to varying degrees, each also suffers attendant limitations.

For example, shielding requires the use of expensive conductive material to prevent emitted radiation from leaking outside of the shielded enclosure. This, however, increases heat accumulation inside the computer, which can be exacerbated by reduced airflow or inadequate ventilation.

The other methods, slowing the clock, data rising and falling edges, and SSCG, all result in reductions in the timing margins, in addition to other problems. Reductions of the timing margin are frequently undesirable for high-speed systems for which system timing is critical. Timing requirements of systems implementing SSCG are further limited by the very jitter generated, based upon a frequency modulated analog signal, to reduce the EMI emissions. Moreover, none of these EMI reduction methods is scalable. That is, the EMI reduction cannot be programmed without adversely impacting system timings. Furthermore, none of these methods wholly prevents radiation problems from occurring inside the computer.

Therefore, a method which overcomes these problems would be useful.

SUMMARY

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DESCRIPTION OF THE PREFERRED EMBODIMENT(S)

One embodiment of the present disclosure provides a method for a gated direct sequence spread spectrum (GDSSS) clock distribution in which an original clock signal is divided and spread over a wider frequency spectrum to reduce the radiated emissions. As used herein, a clock is defined as integrated circuit based timing devices such as are manufactured by companies like ICS or Pericom. In an embodiment, the clock signal is modified by small, random or pseudo-random phase shifts. Unlike with typical spread system solutions, these frequency hops, which spread the energy spectra (EMI), can occur at the frequency of the clock.

Figure 1:
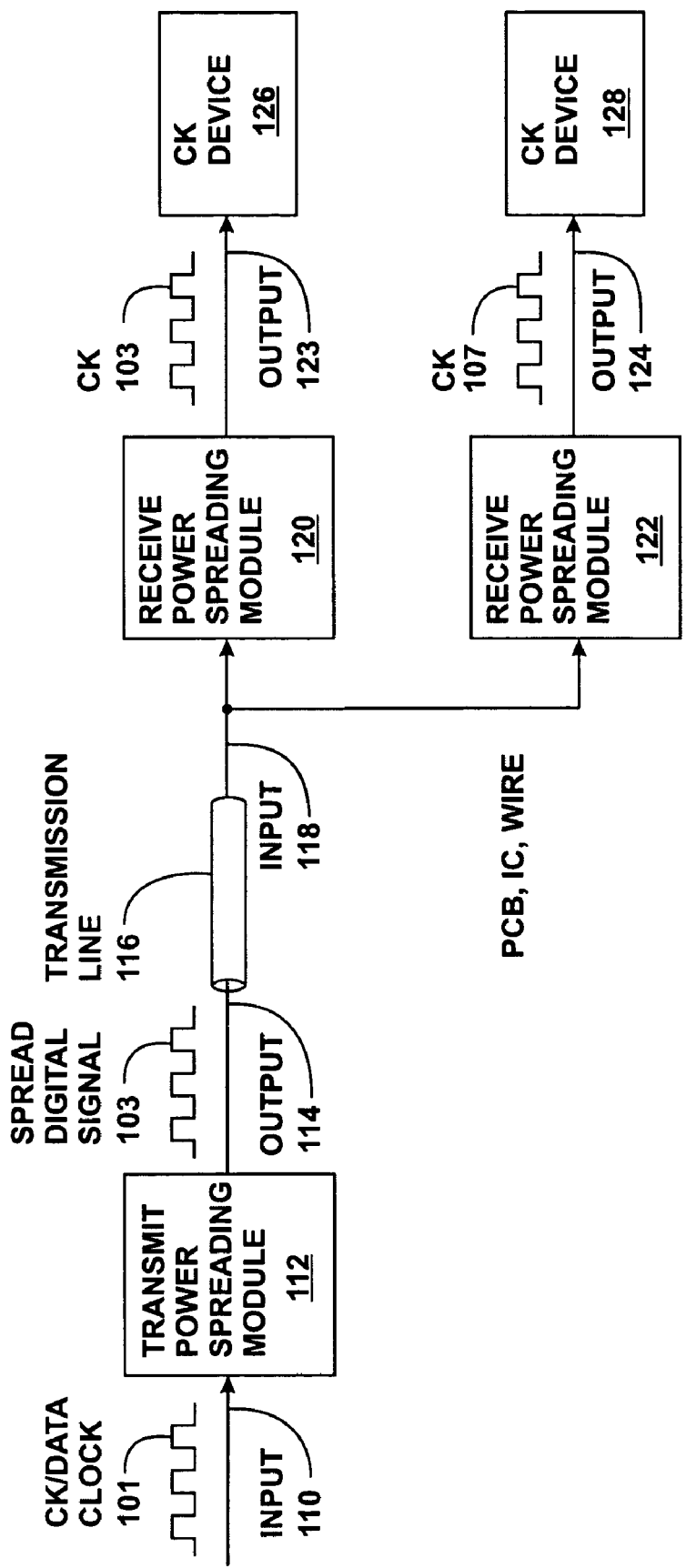
FIG. 1 is a simplified block diagram presenting an overview of the method for producing a spread digital clock signal according to at least one embodiment of the present disclosure.

The present disclosure is best understood with a reference to the specific embodiments illustrated herein. Specifically, FIG. 1 illustrates a block diagram presenting an embodiment of a clock distribution network system in accordance with the present invention.

In operation, a signal labeled clk/data 101 is received at an input 110. For purposes of discussion, the signal clk/data 101 can be referred to as either clock signal 101, or data signal 101 for ease of discussion. It will be appreciated that when referred to as clock 101, the element represents a digital signal comprising a substantially fixed frequency. Conversely, when referred to as data 101, the element comprises more than one frequency component.

Figure 2:
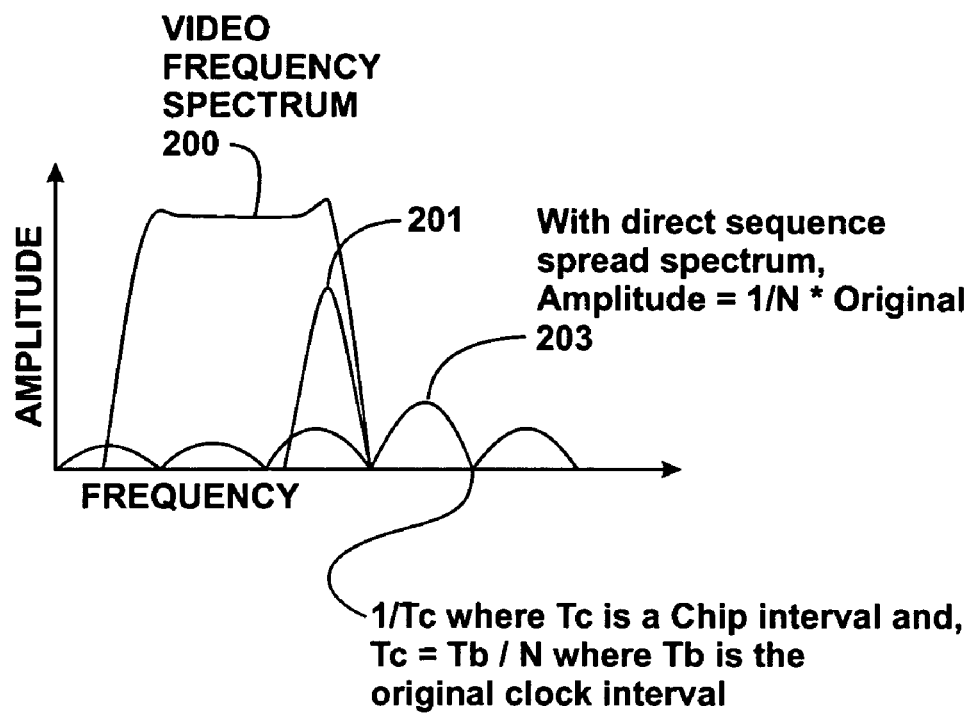
FIG. 2 is a graph showing a power profile of frequency components according to at least one embodiment of the present disclosure.

The clock 101 is received at a transmitting power-spreading module 112. Clock 101 may be a digital bit stream, or a digital clock signal having a periodic trapezoidal-type waveform. EMI emissions from clock signal 101 are represented by the line 201 in FIG. 2, which is a power profile of a specific frequency component. Also illustrated in FIG. 2 is a frequency spectrum 200 that corresponds to an unmodified video frequency spectrum. As illustrated, the frequency component 201 of the clock 101 overlaps the frequency spectrum 200. This can result in interference with the video data, when the power of frequency component 201 is too large.

When received at transmitter power-spreading module 112, the clock/data signal 101 is modified, based upon a power spreading function, to provide a spread digital signal 103 to output 114, which in turn is coupled to a transmission line 116. Spread digital signal 103 is represented by line 203 in the graph of FIG. 2, which indicates that the emissions of the clock/data signal 101 (line 201) have been spread over a larger frequency spectrum (line 203) as compared to the original clock/data, thereby reducing EMI, and potential adverse affects on other frequency spectra, such as the video spectrum 200.

Transmission line 116 is generally illustrated to be a non-wireless transmission media, such as a wire guide, printed circuit board trace, co-axial cable, integrated circuit trace, or any other form of non-wireless transmission media.

Transmission line 116 provides the spread signal 103 via an input 118 to one or more receiver power spreading modules such as device 120 and 122. It will be appreciated than on or more receiver modules can be used, and that the receiver modules may reside on integrated circuit devices and/or on printed circuit board devices. The power spreading modules 120 and 122 in turn drive devices 126 and 128, which themselves may be printed circuit boards comprising integrated circuit devices. Typically, the receiver power spreading modules 120 and 122 will implement an identical power spreading function. Therefore, for purposes of illustration, only one of the receiver power spreading modules illustrated in FIG. 1 will be discussed.

Receiver power spreading module 120 receives the spread digital signal 103 and produces a clk/data signal 105 which is a representation of the original clk/data signal 101. Depending upon specific implementations, the clk/data signal 105 can have a known phase relationship with clk/data signal 105, or can be asynchronous relative to the clk/data signal 105. Specific implementations associated with the system of FIG. 1 will be better understood with reference to FIGS. 3 through 10.

Figure 3:
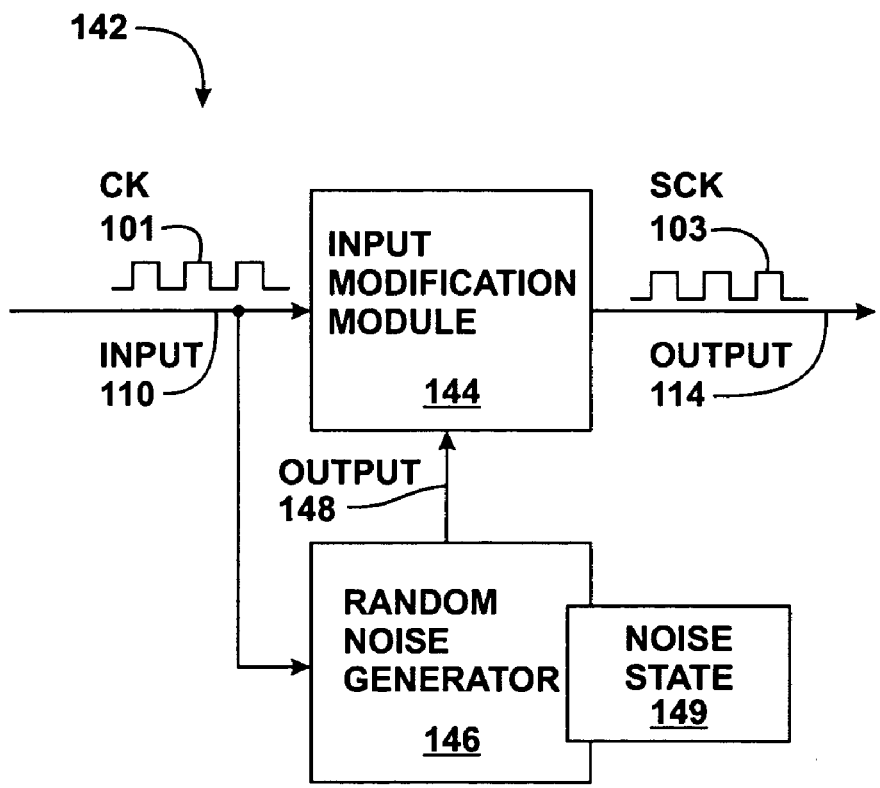
FIG. 3 is a block diagram illustrating an implementation of a transmit module according to at least one embodiment of the present disclosure.

FIG. 3 illustrates one implementation of a transmit module 142 according to an embodiment of the present disclosure. As seen in FIG. 3, the transmit module 142 primarily comprises two main blocks, an input modification module 144, and a random digital noise generator module 146. In one embodiment, random digital noise generator module 146 can be a pseudo random digital noise generator. In another embodiment, random digital noise generator module 146 can be a Gaussian digital noise generator. Random digital noise generator module 146 may employ series of registers to produce a noise state to provide a binary stream to the input modification module 144, as will be discussed in greater detail below.

In operation, a clock signal 101 is provided to input modification module 144 via input 110. Clock signal 101 may also be provided to random digital noise generator module 146, as indicated by the dotted line from input 110 to random digital noise generator module 146, or a separate clock may be used to drive the pseudo random noise generator 146, such as when the signal 101 is a data signal. The random digital noise generator module 146 serves to generate a random sequence of noise states 149 that are used to provide a power spreading digital noise signal, generally comprising a binary data stream, onto output 148 for use by input modification module 144 to facilitate producing a spread digital signal 103 from the clock 101.

After implementing a power spreading function provided by random digital noise generator module 146, input modification module 144 transmits a spread digital clock signal 103 via output 114 to other modules in the system. In an embodiment, random digital noise generator module 146 includes a look-up table. In another embodiment, random digital noise generator module 146 may be a liner feedback shift register (LFSR). In yet another embodiment, the look-up table access, or the state sequence of the LFSS can be gated, or controlled by logic to produce a desired number of repeating states, as further discussed with reference to FIG. 4. In one embodiment, the number of repeating states is selected to be an even number of states to facilitate the use of a phase locked loop (PLL) circuit having an even divider in its feedback loop, which is more readily implemented than odd dividers.

Figure 4:
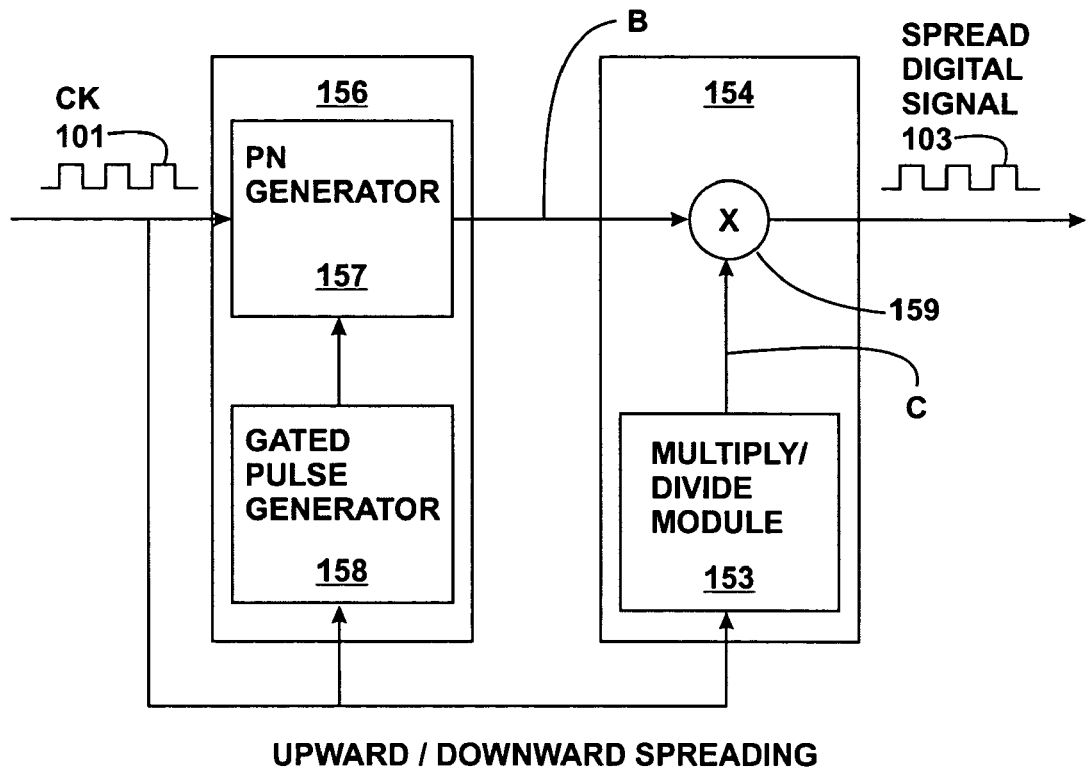
FIG. 4 is a block diagram illustrating an embodiment of a pseudo random noise generator according to at least one embodiment of the present disclosure.

FIG. 4 illustrates an embodiment of a pseudo random noise generator 156, corresponding to random noise generator 146, using a gated pseudo random number (PRN) generator 157, which may be implemented using a LFSS. Specifically, the gated pulse generator 158 maintains a count or state based upon the number of pulses received at its input, while the PRN generator 157 cycles through a sequence of states and outputs a random binary stream B based on these states. In response to receiving a predefined number of pulses, the gated pulse generator 158 generates a reset signal to the pseudo random number generator 157, whereupon the pseudo random number generator 157 is reset or reloaded to a starting value, and begins cycling through the sequence of states once again.

In one embodiment, the gated pulse generator 158 resets the pseudo random number generator 157 to allow for an even number of states to be generated. The gated pulse generator 158 can also be programmable so that the number of states in the sequence generated by the pseudo random number generator 157 is selectable by a system (e.g., application drivers or system BIOS) or by a user (e.g. based on a program state, or by an external pin). By varying the number of states associated with the pseudo random number generator 157, the amount of EMI reduction can be varied, as will be discussed herein.

Module 154 is a more detailed embodiment of an input modification module such as input modification module 144. Module 154 receives the clock 101 at a multiply/divide module 153. In response, a clock pulse is provided to the multiplier 159 having a frequency component that can vary from the original clock 101. Below some multiplication value, for example 1, the clock provided by multiply/divide module 153 will produce a clock having a frequency component less than or equal to clock 101. Above that multiplication value the clock provided by multiply/divide module 153 will produce a clock having a frequency component greater than or equal to the clock 101.

In this manner, the generated spread digital signal 103 can be "up-spread" to frequencies higher than the original clock 101, or "down-spread" to frequencies lower than the original clock 101. By facilitating up-spreading and down-spreading, it is possible to move EMI emissions away from critical frequencies.

The clock pulse from multiply/divide module 153 and the random binary stream from the pseudo random number generator 157 are combined by multiplier 159 to produce the spread digital signal 103. In an embodiment, the multiplier 159 is implemented using an exclusive-OR gate.

Depending upon the application and where the interferences occur, designers may choose to use either up-spreading or down-spreading. Spreading upward is typically not cost-effective for applications requiring a high speed clock. For example, a 100 MHz clock would require 1.6 GHz chip clock for a spreading code of 16. However, upward spreading is cost effective and does work well for lower clock speeds.

Figure 5:
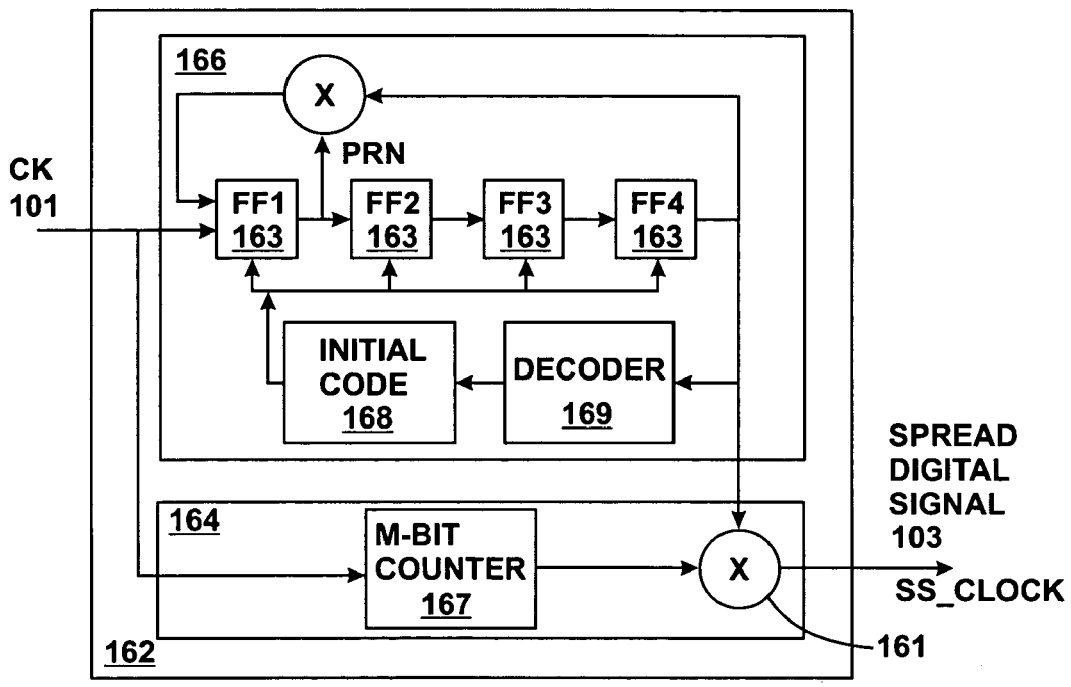
FIG. 5 illustrates a block diagram of a random digital noise generator or code generator according to at least one embodiment of the present disclosure.

FIG. 5 illustrates a block diagram 162 of an alternate embodiment of a transmit power spreading module. In one embodiment, a code generator such as Maximum-Length Shift-Register sequence generator or M-sequence generator 166, generates a random code $2^M-1$ states long, where M is the number of register stages 163, flip-flops 163 or storage elements 163 within the device 166. In another embodiment, the maximum-Length Shift Register sequence generator 166 generates a random code with $2^M$ states in length by having the decoder 167 decode the last state. For example, if four registers or flip-flops 163 (M=4) are required, then the repeated sequence will complete and then begin to repeat itself after transmitting fifteen bits (e.g., $2^{M-1}$ bits).

If four registers, i.e. flip-flops 163 (M=4), are used and an even number of states are desired, then the decoder 167 decodes the last state in the repeating sequence and inserts one additional initial state, such as the last state, to add an extra state to the sequence, therefore, repeating the sequence at $2^M$ cycles instead of $2^M-1$ cycles, as is common with DSSS applications using CDMA communication.

It will be appreciated that a pseudo-random number generator, for example the Maximum-Length Shift-Register sequence generator or m-sequence generator 166, generates a random code with $2^M-1$ bits long, where M is the number of register stages with feedback connections. The initial code loaded to the registers 163 is shifted to the left one bit at a time through a total of $2^M-1$ sequential shifts to complete one pseudo-random bit stream cycle. The feedback circuits between the M elements in the register (which is often one or more XOR gates connected to one or more of the M flip flops 163, input, and/or output of the circuit, and are not illustrated) ensures that the M bits change in state on each shift in order to transform the M bits into a $2^M-1$ pseudo-random repeating bit stream. Therefore, the device will cycle through all possible $2^M-1$ serial stream bit states before beginning to repeat the sequence again. In essence, the shift register is shifted back to the original state or binary value within in the M bit device every $2^M-1$ shifts. In practice, M may be any number and is usually a number greater than three.

Multiplier 161 receives a pseudo random binary stream by being coupled to the output of FF4. A representation of clock 101 at a lower frequency is received from the M-Bit counter 167. The representation of the clock 101 at the output of the counter 167 is combined with the pseudo random binary stream from module 166 at the multiplier 161 to generate the spread digital signal 103. Once the spread digital signal 103 is transmitted from a transmit power spreading module, such as those illustrated in FIGS. 3-5, the spread digital signal 103 is received at a receiver power spreading module, e.g. 120, 122, or 170.

Figure 6:
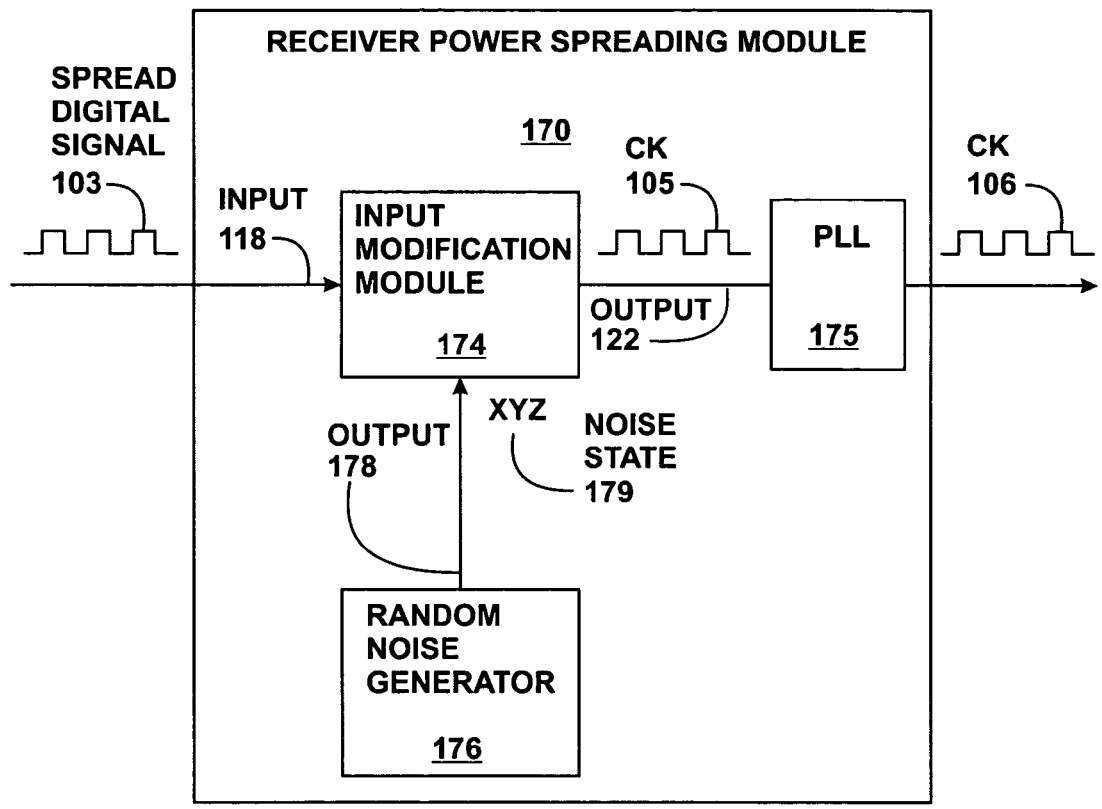
FIG. 6 is a block diagram illustrating a receive power spreading module according to at least one embodiment of the present disclosure.

FIG. 6 illustrates a receive power spreading module 170 which in one embodiment corresponds to a receive power spreading module 120 of FIG. 1. Receive power spreading module 170 includes input modification module 174 and a random noise generator 176. Typically, in a system such as is illustrated in FIG. 1, a receiver power spreading module 120 will have a priori knowledge of the transmit power spreading module 112. Because of the a priori knowledge of the transmit power spreading module, the receive power spreading module 120 knows the exact random noise generator function implemented by the transmit power spreading module 112.

By implementing the identical random noise generator function in the random noise generator 176 as was implemented in the transmit power spreading module, it is possible to recover the clock/data 103, which was originally spread to produce the spread digital signal 103. In addition, the clock 105 is provided to a phase locked loop 175 in order to create a clock/data signal 106 that is synchronized to a known phase relationship with the original clock 101, by delaying the phase-locked loop feedback by an amount equivalent to an insertion delay, which includes the random number spreading signal.

It will be appreciated to those skilled in the art, that the receive power spreading module 170 will generate the clock 105 in two steps. The first step is an acquisition step, during which synchronization to the spread clock/data signal 103 is acquired. Acquisition is obtained by comparing the incoming bitstream with the power spreading function of the receiver 170 random noise generator 176, on a clock by clock basis. If a particular state, random number code, or noise state is found to be a match, then the process continues to determine if state N+1 is also valid, otherwise the first noise state is held. If state N passes, it continues to the next state until all states are verified otherwise the process continues with the first initial state. Therefore, by providing a random noise generator 176 that generates the same random noise states as the transmitting spreading module, it is possible to recover the original clock/data 101 in a manner that allows for synchronous system operation.

One advantage of the receive power spreading module 170 is that any noise induced upon the spread clock/data signal 103 will itself be spread and added to the noise floor of the clock signal 105. As a result of this spreading, any noise impulses on the spread clock/data signal 103 will have no effect on the recovered clock 105 or 106. This is advantageous, in that with synchronous systems, it is desirable for the number of clock pulses to be the same at various points of the system. Therefore, by spreading the EMI noise on the spread clock/data signal 103, the number of clock cycles received at the transmit power spreading module and the number of clock cycles produced by the receive power spreading module 170 can be maintained the same.

Figure 7:
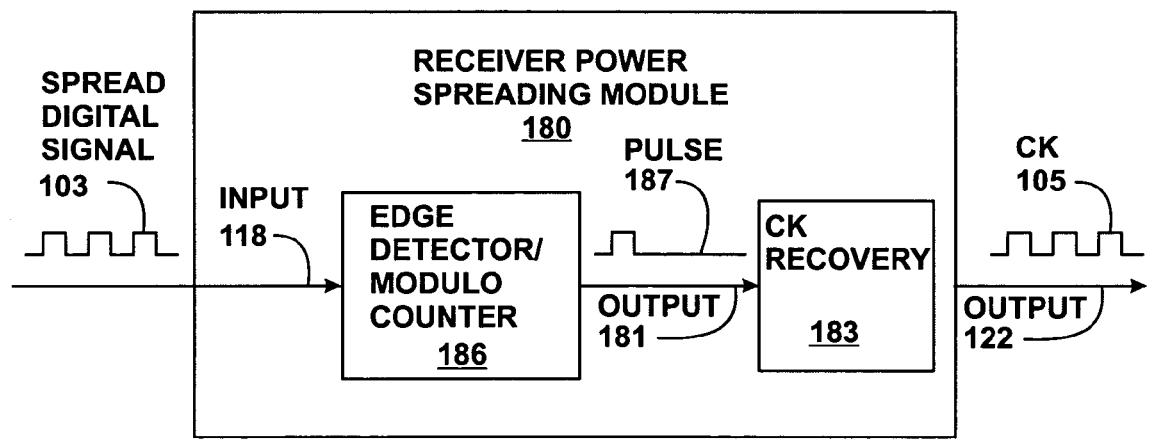
FIG. 7 is a block diagram illustrating another implementation of a receive power spreading module according to at least one embodiment of the present disclosure.

FIG. 7 illustrates yet another embodiment of a receive power spreading module 120. The receive power spreading module 180 of FIG. 7 receives the spread digital signal 103 at an input 118 coupled to an edge detector modular counter 186. It is the edge detector/modular counter 186 that interprets the information received on the spread digital signal 103 to generate a pulse at its output 181 which is used by a clock recovery signal 183 to regenerate the original clock 101 as clock 105 on output 122.

Specifically, the edge detector modular counter 186 has a priori knowledge of the spread digital signal 103 being received. As a result, the edge detector/modular counter 186 knows how many rising clock edges or falling clock edges, the spread digital signal 103 will have in its repeating sequence. For example, for a $2^M$ sequence, where M is equal to 4, there will be a fixed number of clock transitions based upon the initial value with which the pseudo number generator was loaded. Therefore, the edge detector/modular counter 186 includes a counting mechanism that generates a pulse 187 each time the spread digital signals 103 count sequence repeats. For example, assuming for a value of M there are to be a total of twelve rising edges, the edge detector modular counter 186 would generate a pulse 187 at output 181 every twelve clock edges.

The pulse generated at output 181 is provided to the clock recovery module 183 which includes a phase locked loop and a divide by N counter (not shown) in order to regenerate a representation of the original clock 101 illustrated as clock 105 at output 122. One disadvantage with the implementation of FIG. 7 is that in a noisy environment where the spread digital signal 103 can pickup EMI noise, the EMI noise may be interpreted as an additional rising edge which would result in the pulse 187 at output 181 being generated at an unexpected time. This should result in the clock 105 not having a fixed frequency, resulting in an inability to implement a synchronous system.

Figure 8:
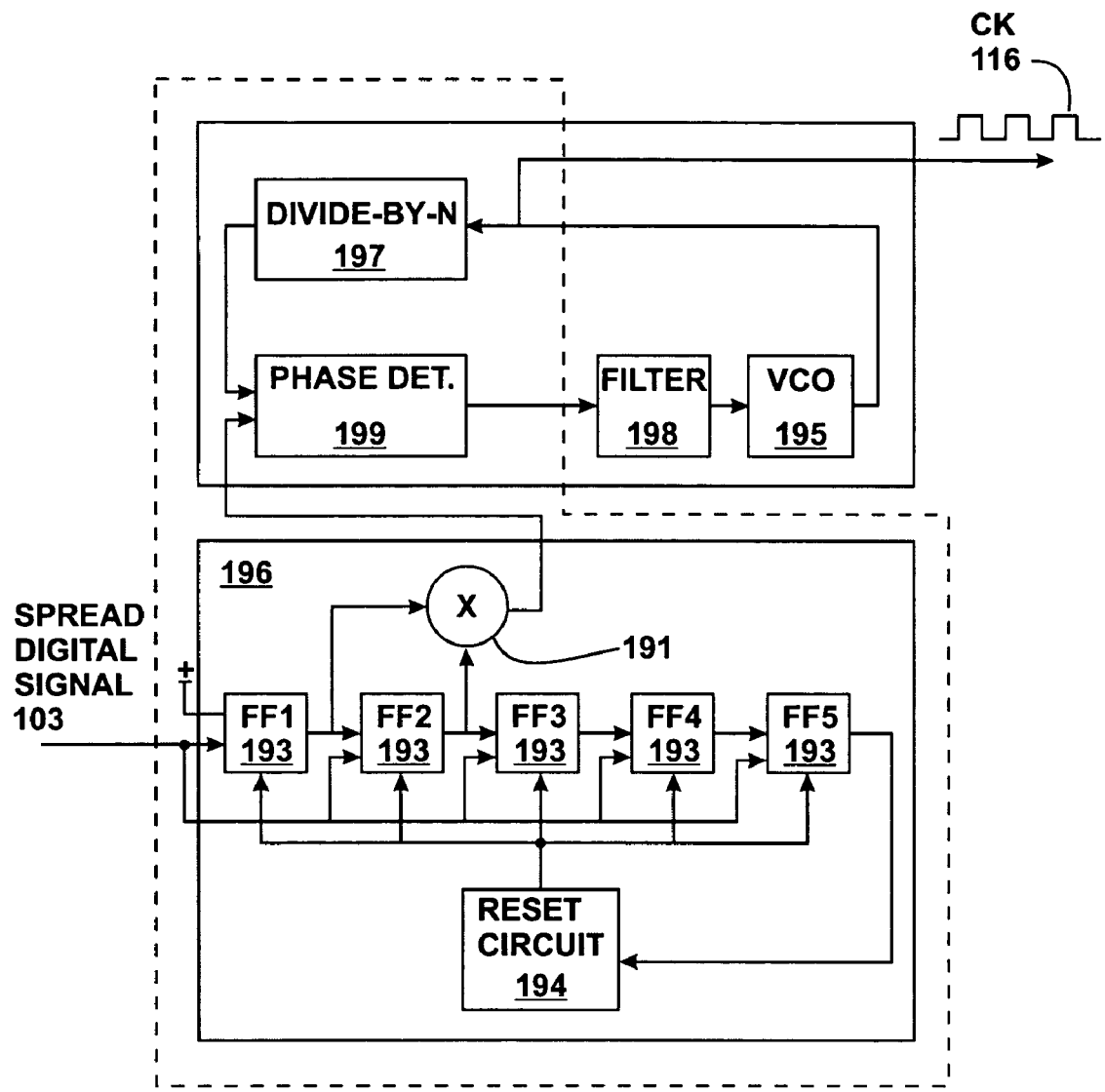
FIG. 8 illustrates a more detailed embodiment of the receive power spreading module according to at least one embodiment of the present disclosure.

FIG. 8 illustrates a more detailed embodiment of the receive power spreading module of FIG. 7. Generally, the module 196 corresponds generally to the edge detector/modular counter 186 of FIG. 7. Specifically, five flip-flops 193 are connected serially with the last bit driving a reset circuit 194. The reset circuit 194 is in turn capable of resetting the series connected flip-flops 193 (FF1-FF5) in order to begin a new count.

While it will be appreciated that many types of counters can be used, the counter illustrated in module 196 operates by walking an asserted value along the flip-flop 193 chain with each active edge of the spread digital signal 103. For example, after a reset caused by reset circuit 194, the values on the outputs of each of the flip-flops 193 would be negated, i.e., zero. As a result, the multiplier 197, which functionally is an exclusive-OR, will provide a low value at its output. Upon receiving a first active edge from the spread digital signal 103, following reset, an asserted value, such as a logic level one, will be latched onto the output of the first flip-flop FF1.

As a result of the output of the first flip-flop FF1 being asserted, the exclusive-OR function 197, now receiving an asserted signal and a negated signal, provides an asserted signal at its output. Following a next active edge transition of the spread digital signal 103, the asserted value at the output of the first flip-flop FF1 will be latched into the output of the second flip-flop FF2, as well as an asserted value being latched into the output of the first flip-flop FF1. Since the exclusive-OR function 197 has now received two asserted inputs, its output will be negated, where it will remain for the remainder of the counting sequence. The counting sequence will continue until the asserted signal is received at the output of the flip-flop five FF5, whereby the reset circuit will reset each of the flip-flops 193 that have negated values.

It will be appreciated that while the edge detector/modular counter 196 has been described as being reset to a negated value on each of its outputs in one embodiment, it will be appreciated that in other embodiments the reset circuit could preload a specific value into the flip-flops 193. In addition, while a simple bit walking counter has been implemented, it would be possible for more complicated counters to be implemented as well.

In this manner, the exclusive-OR module 197 generates the pulse 187 which, corresponds to the repeating of the spread digital signal 103 sequence based upon an expected count. This pulse 187 is provided to a phase detector 199, which in turn provides its output to a filter 198 that in turn provides its output signal to a VCO 195, which in turn provides its output signal to a divide by N counter 197 that is fed back to the phase detector 199. In this manner, the clock recovery module 183 (FIG. 7) can be implemented in a manner well recognized by the art, where the phase-locked loop stability is then is directly related to the relative duty cycle of incoming pulses to output clock frequency.

Figure 9:
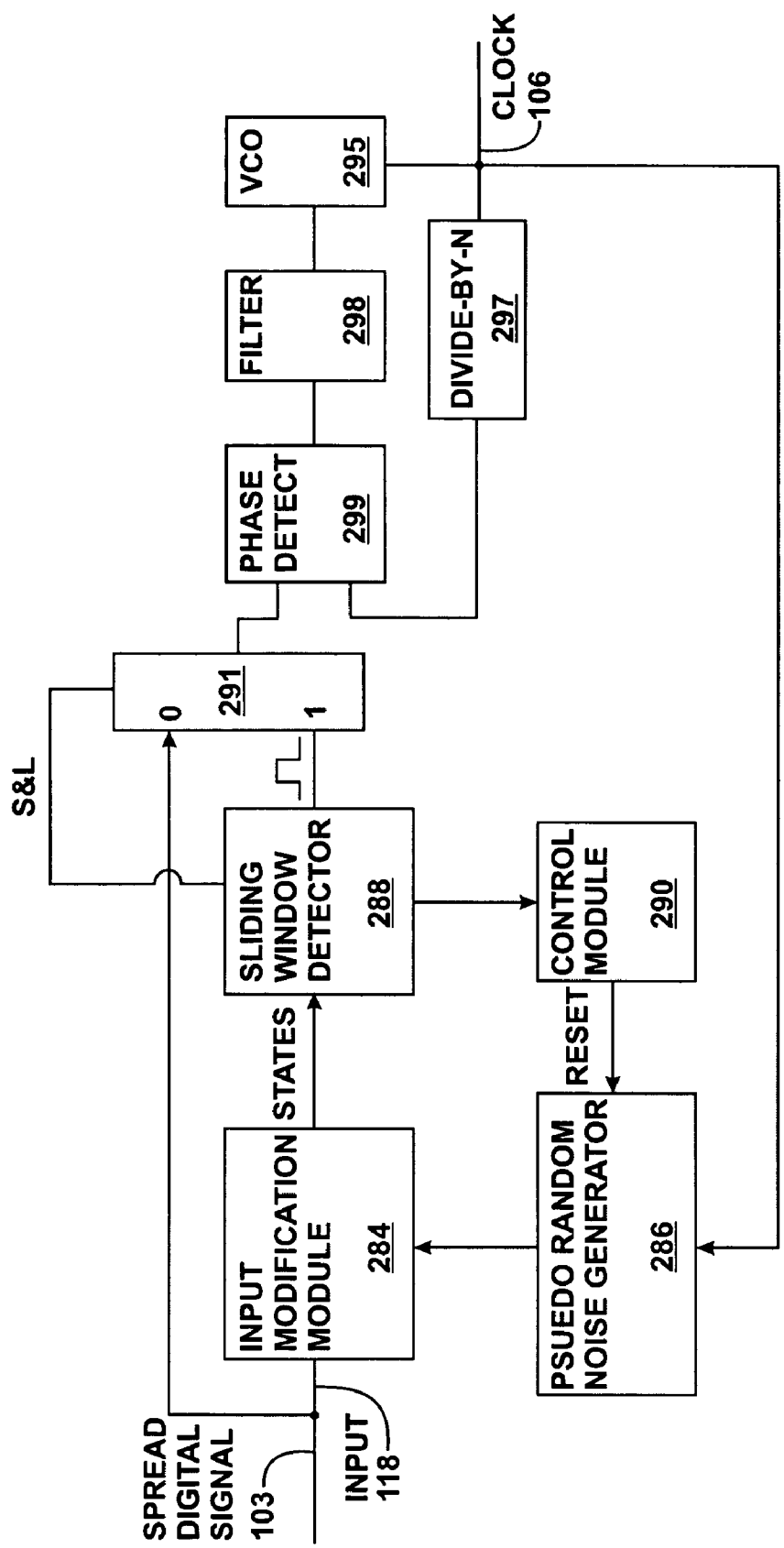
FIG. 9 is a block diagram illustrating another implementation of a receive power spreading module according to at least one embodiment of the present disclosure.

FIG. 9 illustrates yet another embodiment of a receive power spreading module 170. In operation, the receive power spreading module of FIG. 9 allows for the detection of a spread digital signal 103, whereby when detected, the spread digital signal 103 has its power re-spread in order to recover the original clock. However, when the presence of digital signal 103 is not detected, it is assumed that the signal being received at the input 118 of the input modification module 284 is an un-spread digital clock signal, which is passed through the system instead of regenerating the spread digital signal 103.

In order to understand the operation of the receive power spreading module of FIG. 9, it is assumed that the module is initially coming up from a reset state. When coming up from a reset state, the phase locked loop portion including VCO 295 is designed to generate an output clock that reasonably approximates an original expected clock expected to be recovered from the spread digital signal 103. This clock is provided to the pseudo random noise generator 286, and any other modules needing control during the startup process.

As a result of the startup process, the control module 290 will hold the pseudo random noise generator 286 at a specific state, which in turn will provide a value to the input modification module 284. For example, a one (1) can be provided to the input modification module 284 during the acquisition phase. Since the receive power spreading module of FIG. 9 is anticipating a spread digital signal having a specific signature, during the reset portion the input modification module 284 can receive the spread digital signal 103, and, by using the startup clock generated by the VCO, latch a sequence of values for states corresponding to the received spread digital signal 103.

It is these values or states which can be provided to a sliding window detector 288 to look for a specific sequence, which is a known sequence, associated with the spread digital signal 103. For example, the spread digital signal 103 may have a sequence that repeats every 16 bits, however, the sliding window detector 288 knows that there is a unique bit sequence that can be detected by monitoring only a subset of that total number of bits. Therefore, for example, only three or four bits may need to be detected in order to ascertain whether or not the signal being received actually contains the spread digital signal 103 signature.

When the sliding window detector 288 positively identifies the spread digital signal 103 as being received, the control module 290 is signaled and the pseudo random noise generator 286 is taken out of reset and allowed to cycle through its states. In addition, the sliding window detector 288 will activate a select line to multiplier 291 to allow the signal from the sliding window detector 288 to be passed to the phase detector 299 in order to allow the phase lock loop comprising the elements 299, 298, 295, and 297 to generate the clock 106, which is a representation of the original clock which was spread to generate the spread digital signal 103. Note that in this embodiment, the sliding window detector 288 may also need to provide a value to the divide by N counter 297 indicating that the phase locked loop will have to multiply the pulse being detected.

Note that since the pseudo random noise generator 286 is generating all the states, and the input modification module 284 is modifying all the signals being received from the spread digital signal 103, that it would be possible for the input modification module to generate the clock 106 directly, and bypass the sliding window detector 288 in order to provide the clock to the phase detector 299 for clock acquisition. This clock can be generated to have a known phase relationship with the original clock 101, by delaying the phase-locked loop feedback by an amount equivalent to an insertion delay, which includes the random number spreading signal.

However, in another embodiment where the sliding window detector 288 never detects the expected signature from the spread digital signal 103, an assumption is made that the signal being received at the input modification module 284 is not a spread digital signal 103, but an actual data or clock signal that should be passed through unaltered. In this case, the sliding window detector 288 would signal the multiplier 291 to pass the signal at its other input to the phase detector 299. It will be appreciated when the clock being received at the input is to be passed through to the output of the receive power spreading module 170, that the divide by N counter 297 will need to be reprogrammed in order to allow the signal to pass through.

Once advantage of implementing a receive power module of the type illustrated in FIG. 9, is that either a known spread signal can be re-spread in order to generate an expected clock, or, for situations where it is desirable not to use a spread signal, an ordinary clock can be used and passed through the device.

Figure 10:
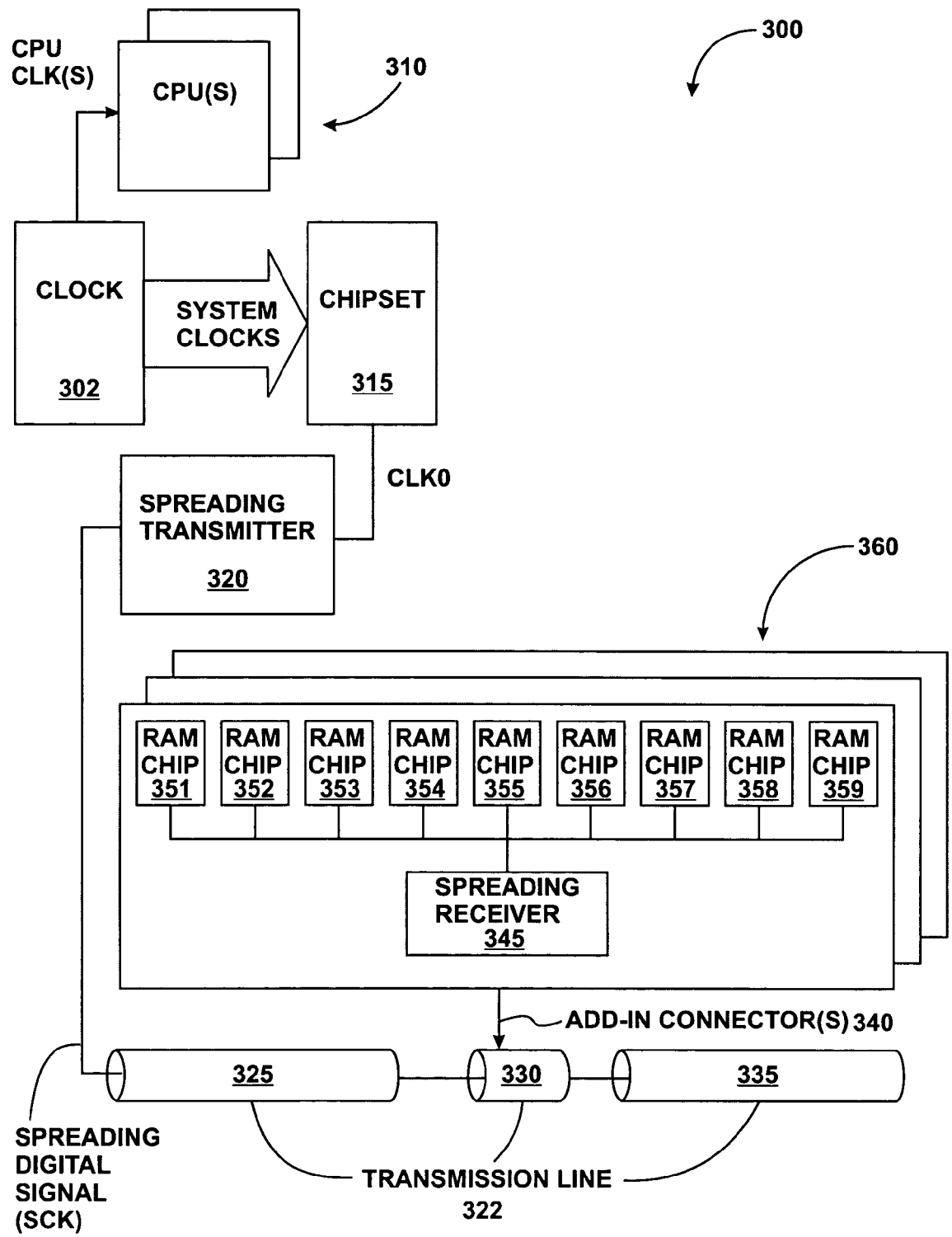
FIG. 10 is a block diagram illustrating an application utilizing the power spreading concepts according to at least one embodiment of the present disclosure.

FIG. 10 illustrates a specific application utilizing the power spreading concepts disclosed herein. It will be appreciated that the application of FIG. 10 can be any number of applications. For example, FIG. 10 can represent a motherboard, set-to-box, camera, printer, audio/video adapters, servers, and network equipment. The memory devices of FIG. 10 represent random access devices, such as dynamic random access devices and static random access devices. As device speeds increase, such as with dual data rate random access devices, the need to reduce emissions will also increase. Specifically, FIG. 10 includes a clock driver 302 that provides CPU clocks to CPU(s) 310, and clocks for use by other devices, such as other CPUs, add-in slots, or reference clocks, to a chipset 315. The chipset 315 can be used to control various functions and/or distribute various representations of the received clock.

In a specific embodiment, the chipset 315 transmits a clock 0 to a transmitter 320. The transmitter 320 operates in the manner previously described herein to provide a spread digital signal 103 to a transmission line 322. In the specific embodiment illustrated, this transmission line 322 comprises a trace on a printed circuit board, such as a motherboard of an information handling system. The transmission line 322 is illustrated to comprise three components, 325, 330, and 335. The transmission line 322 is not shown as a single transmission line in that due to the presence of add-in connectors 340 along the transmission line, an impedance discontinuity in the transmission line can occur. This impedance line discontinuity is represented by the transmission line portion 330.

As a result of the transmission line 330 discontinuity, EMI emissions can result resulting in a noisy representation of the spread clock 103 being received at the receiver 345 on one of the memory devices 360. It will be appreciated that the memory devices 360 can represent memory add-in cards capable of increasing the amount of memory on an information processing system. In response to receiving the spread signal 103 from the transmission line 322, the receiver 345 will spread the power of the spread digital signal 103, to generate a representation of the original clock signal received at the transmitter 320.

As previously discussed, utilizing the disclosed transmission/receiver pair as illustrated, reduces the effect of noise not only transmitted by transmission line 322, but also the effects of noise received by transmission line 322, so that a clean clock signal can be generated by the receiver 345 and provided to the memory chips 351 through 359.

Figure 11:
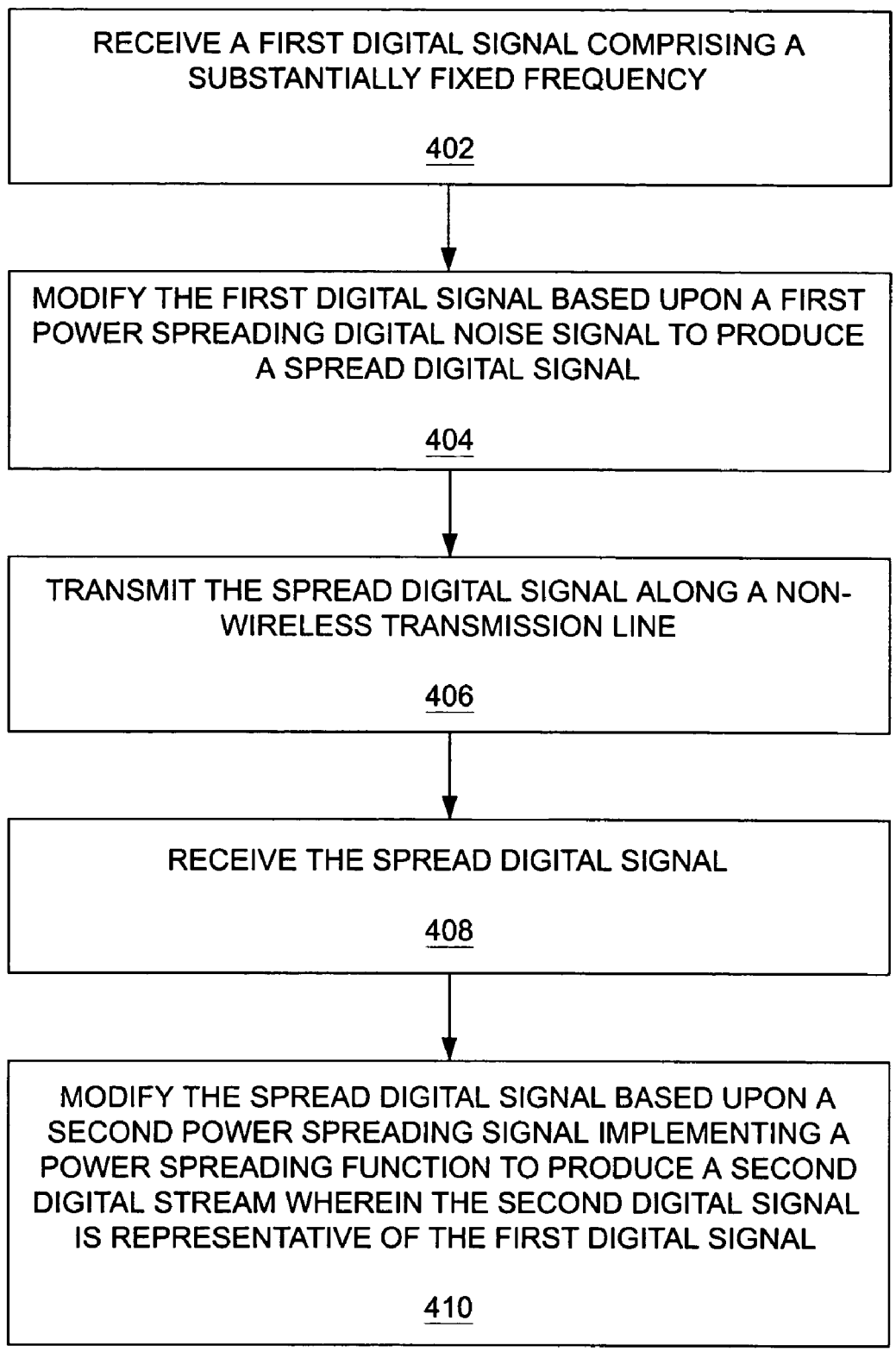
FIG. 11 is a flow diagram of a method for producing a spread digital signal according to at least one embodiment of the present disclosure.

FIG. 11 illustrates, in flow diagram form, a method in accordance with a specific embodiment of the present disclosure. At step 402, a first digital signal comprising a substantially fixed frequency is received. In one embodiment, the first digital signal can be a clock signal used to provide timing control to various digital components. One example of a clock signal is a substantially trapezoidal-type wave form.

At step 404, the first digital signal is modified based upon a first power spreading digital noise signal to produce a spread digital signal. Typically, the first power spreading noise signal will comprise a random number generator. Examples of random number generators capable of being used include pseudo random number generators, and pseudo random Gaussian noise number generators. By modifying the first digital signal based upon the power spreading digital noise signal, a spread digital signal having its power spread over a larger frequency spectrum is obtained, thereby reducing the effects of EMI.

At step 406, the spread digital signal is transmitted along a non-wireless transmission line. Examples of non-wireless transmission lines include wire guides, integrated circuit device traces, and printed circuit board traces, as well as co-axial cables and the like. The spread digital signal is provided along the non-wireless transmission line to the receiving device.

At step 408, the spread digital signal is received from the transmission line at a receiving device. Then, in step 410, the spread digital signal is modified based upon a second power spreading signal implementing a second power spreading function. In one embodiment, the second power spreading function is identical to a power spreading function utilized in the receive step 404. In response to modification of the digital signal, a second digital signal is produced wherein the second digital signal is representative of the first digital signal.

In another embodiment, the power spreading function utilized in step 410 need not utilize the same power spreading function as utilized in the step of modifying. As previously disclosed herein, a counter network can be used in order to effectively recover the clock, thereby spreading the power back to its original form. Likewise, random number generators producing the same random states can be used to modify the spread digital signal to generate the second digital signal representative of the first.

The method of FIG. 11 represents an advantage over the prior art, in that the EMI emissions from a clock signal transmitted over a transmission line can be reduced by spreading the harmonic energies over a greater frequency spectrum. In addition, the recovered clock can be recovered without introducing additional timing constraints on the system, because the recovered clock does not introduce any significant additional jitter into the system.

Figure 12:
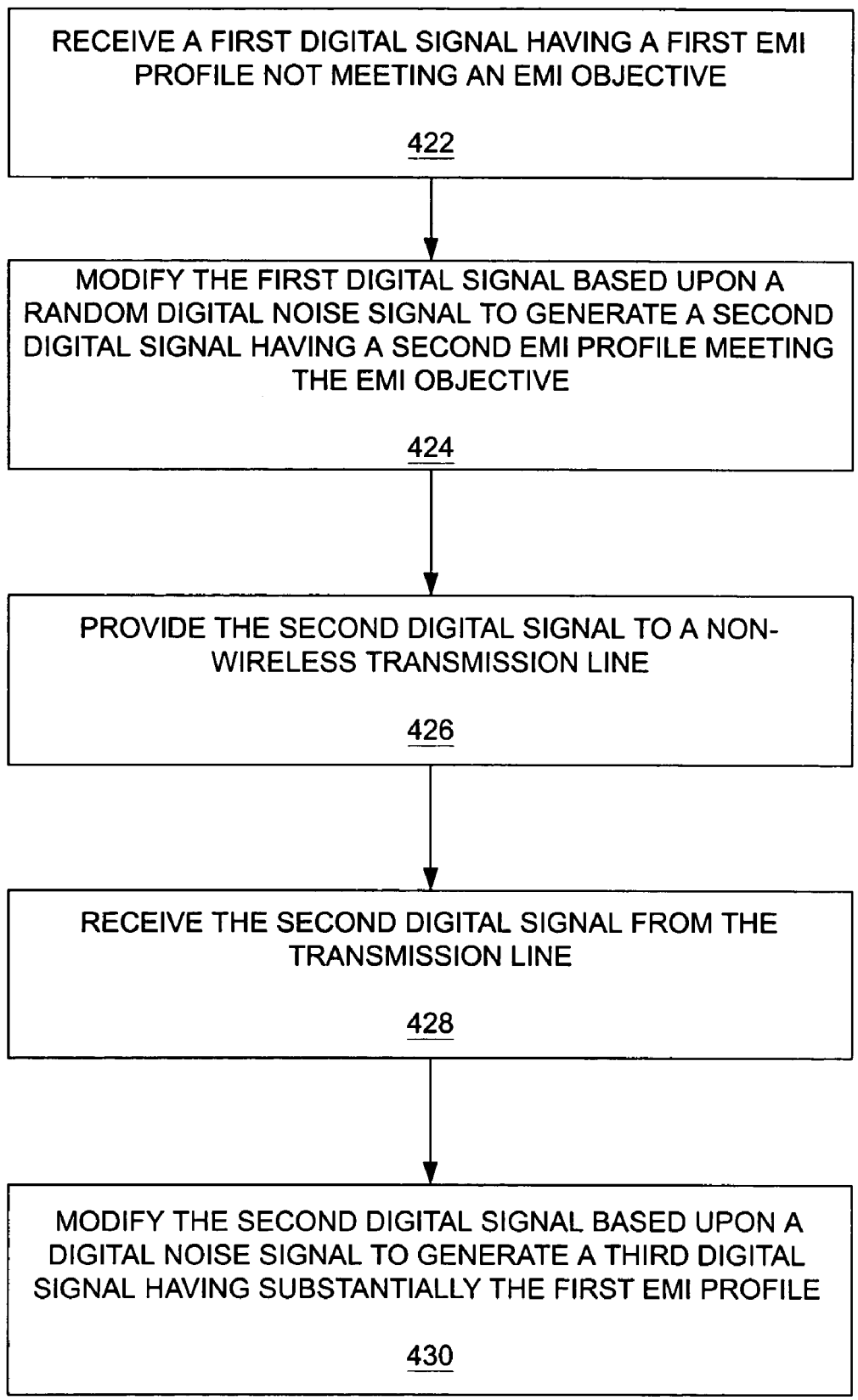
FIG. 12 is a flow diagram of a method for EMI reduction according to at least one embodiment of the present disclosure.

FIG. 12 illustrates, in flow diagram form, another method in accordance with the present invention. At step 422, a first digital signal is received having a first EMI profile that does not meet an EMI objective. For example, a data or clock signal can be received that is known to provide EMI concerns in the system. In step 424, the first digital signal is modified based upon a random digital noise signal to generate a second digital signal having a second EMI profile that meets the EMI objective. One example of an EMI objective is to not surpass a given EMI emission level over a specific frequency. By modifying the signal at step 424, the EMI profile can be met.

At step 426, the second digital signal is provided to a non-wireless transmission line. Examples of non-wireless transmission lines include wire lines, integrated circuit traces, printed circuit board traces, coaxial cables, and the like.

At step 428, the second digital signal is received from the transmission line at a receiving device. In step 430, the second digital signal is modified based upon a digital noise signal to generate a third digital signal having substantially the first EMI profile. As previously described herein, the second digital signal having its power spread can be modified using a digital noise signal, such as a Gaussian noise signal, or a pseudo random noise signal, to generate a representation of the original clock.

Figure 13:
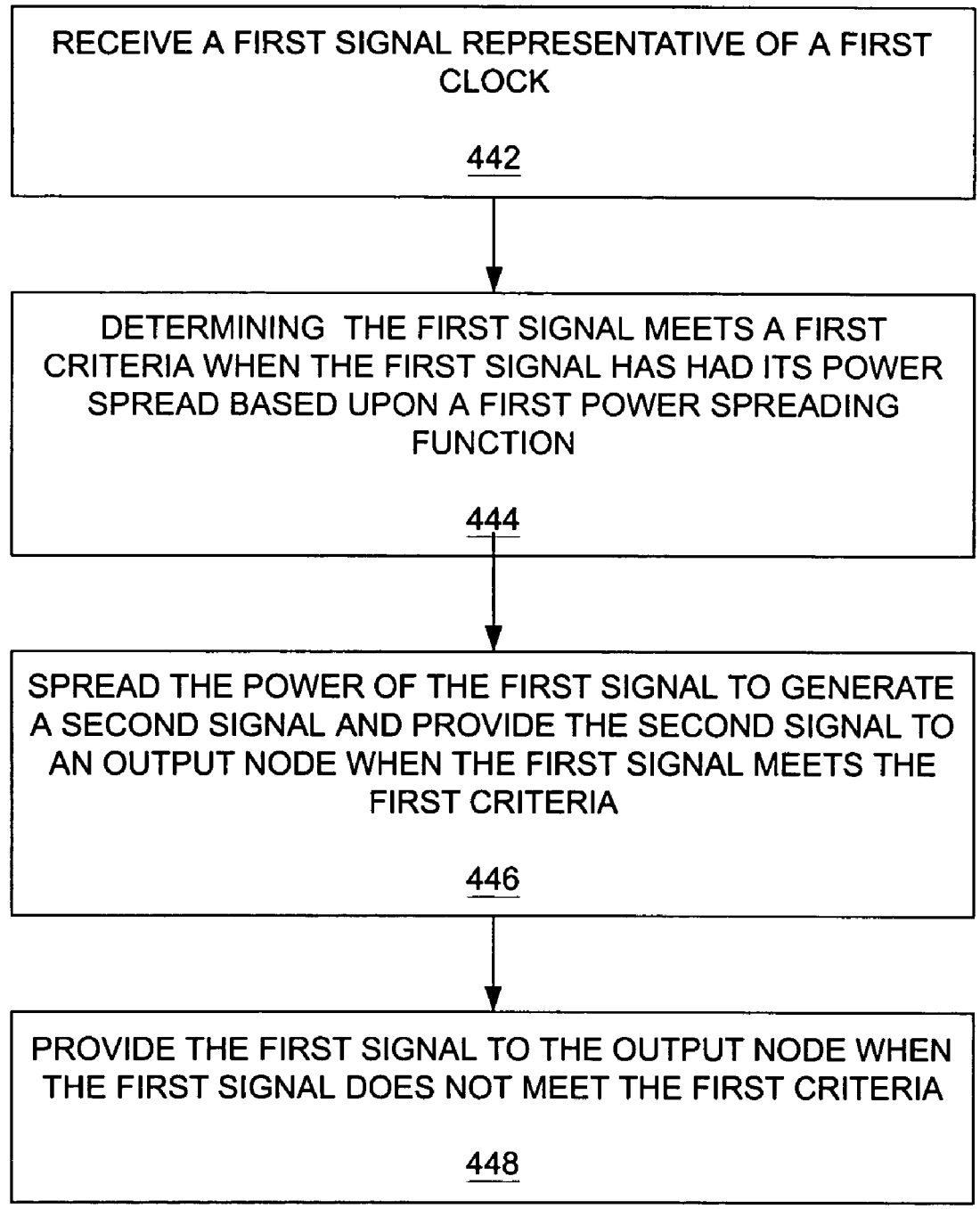
FIG. 13 is a flow diagram of a method for determining when a signal meets a specific criteria according to at least one embodiment of the present disclosure.

FIG. 13 illustrates, in flow diagram form, a method in accordance with an embodiment of the present disclosure. At step 444, a first representation of a first clock is received. At step 444, a determination is made as to whether the first signal meets a first criteria when the first signal's power is spread based upon a first power spreading function. For example, the first criteria can be, does the first signal, after having its power spread, result in a fixed frequency signal, similar to the first clock being generated. Another example of a first criteria would be, does the process of spreading the first signal's power result in a sequence of random states that is an expected sequence of random states.

When it is determined that the first criteria has been met at step 444, the flow proceeds to step 446. At step 446, the power of the first signal is spread to generate the second signal. This second signal is provided to an output node of a device to drive further devices. In effect, if an expected spread signal is received, it will be decoded, e.g. have its power spread, to provide a representation of the first clock signal.

If it is decided that the first signal does not meet the first criteria, the flow proceeds to step 448, where an alternate clock signal is provided at the output. In one embodiment, an alternate clock signal solution could be to provide the first signal received at step 442 to the output node in lieu of attempting to generate a clock by de-spreading the first signal. It will be appreciated that this specific embodiment is advantageous in that it allows for a spreading receiver/transmitting module to work with a variety of received signals.

Another method in accordance with a specific embodiment of the present disclosure comprises a first digital bit stream comprising a first frequency component with a first power profile being received. The first digital bit stream can comprise a fixed frequency clock, or data having a first frequency component.

The first digital bit stream is modified based upon a first power spreading signal to produce a second digital bit stream representing the first frequency component with a second frequency component having a second power profile. For example, referring back to FIG. 2, the first frequency component of a first digital bit stream could be represented by the power profile 201 of FIG. 2. It will be appreciated where the first digital bit stream is a data bit stream, the power profile portion 201 would represent only a single frequency component associated with the data. Once modified, the second frequency component having a second power profile would be represented, for example, by the power profile 203. It is readily illustrated that the power profile of 203 is spread over a greater frequency range than that of the first digital bit stream. As a result, a bit stream that will produce lower EMI emissions is realized.

Figure 14:
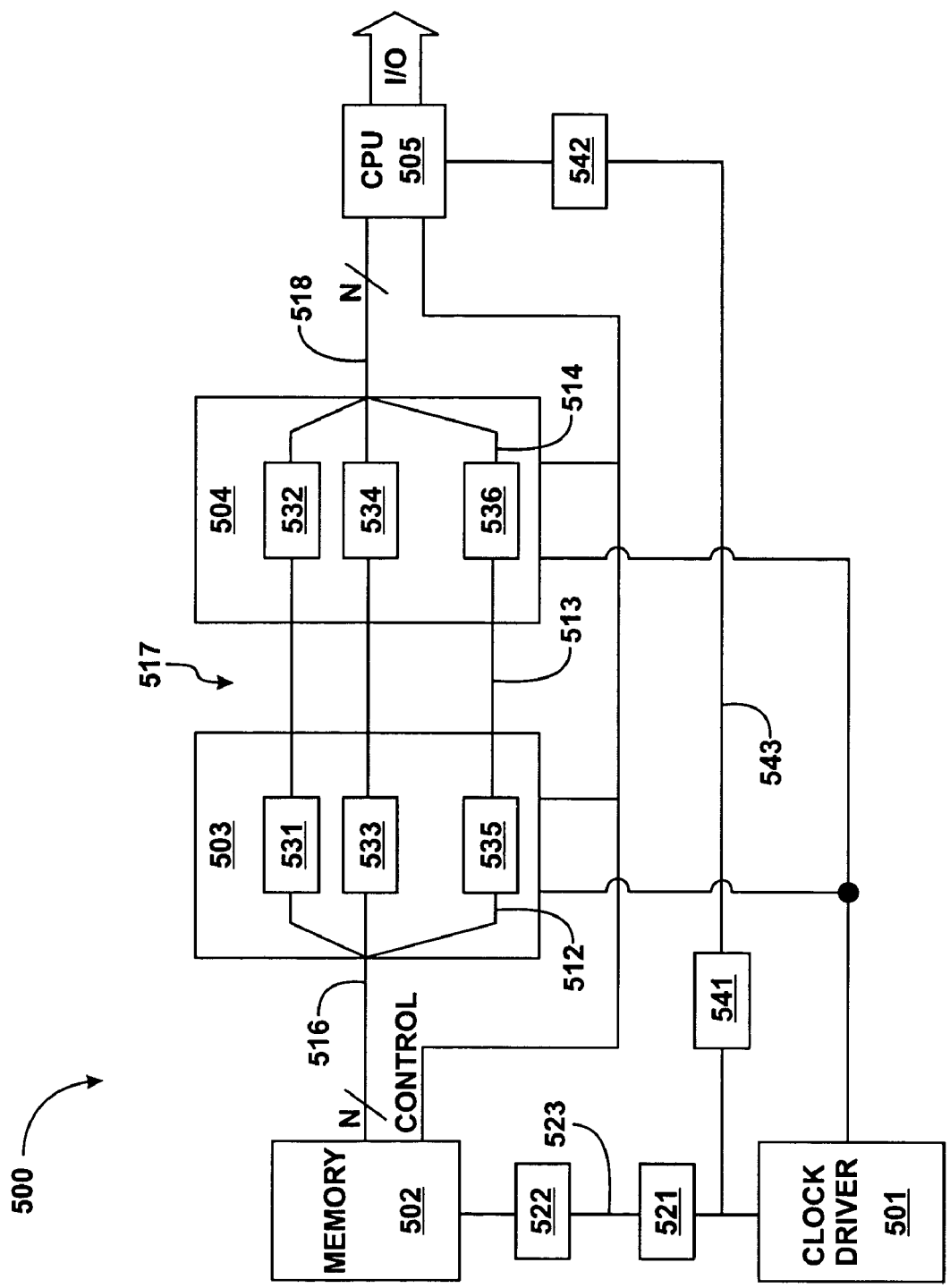
FIG. 14 is a flow diagram of a method for modifying a digital bit stream according to at least one embodiment of the present disclosure.

FIG. 14 illustrates, in block diagram form, a system implementing various aspects of the present disclosure. It will be appreciated that the system of FIG. 14 can represent any of a number of various applications. For example, FIG. 14 can represent a motherboard, set-to-box, camera, printer, audio/video adapters, servers, and/or network equipment, to name a few applications.

FIG. 14 illustrates a clock driver 501 for providing timing information to a memory 502, and a central processor unit (CPU) 505. However, instead of providing a fixed frequency signal to the memory 502 directly, the clock driver 501 is coupled to a transmit power spreading module 521. As described herein, the transmit power module 521 spreads the energy of the fixed frequency signal to generate a signal having a spread power spectrum and provides this spread signal to the transmission line 523. A receive module 522 coupled to the transmission line 523 receives the spread signal and provides a fixed frequency signal, representing the original clock, to the memory 502. It will be appreciated that the receive module 522 may be part of the memory device 502, and that the transmit module 521 may be part of the clock driver 501.

In a similar manner, instead of having clock driver 501 coupled directly to the CPU 505, the clock driver is coupled to a transmit power spreading module 541. As described herein, the transmit power module 541 spreads the energy of the fixed frequency signal to generate a signal having a spread power spectrum and provides this spread signal to the transmission line 543. A receiver module 542 coupled to the transmission line 543 receives the spread signal and provides a fixed frequency signal, representing the original clock, to the CPU 505. It will be appreciated that the receive module 542 may be integrated as part of the memory device 502, and that the transmit module 521 may be integrated as part of the clock driver 501.

Data is transmitted between the memory device 502 and the CPU over a memory bus that includes bus segments 516, 517 and 518. Typically, the memory device 502 will represent a high-speed memory, like a Dual Data Rate memory, that transmits data at data rates that can result in harmful EMI. Therefore, in the embodiment illustrated, each bitline of the data bus benefits from the spreading techniques disclosed herein. For example, bus segment 516 includes a bitline 512, which is provided to power spreading device 535 consistent with the present disclosure. Because data on a memory bus is typically bidirectional data, the power spreading 535 will typically include both a transmit power spreading module, and a receive power spreading module. Control signals from the memory/CPU would control which module is activated based upon whether a data read or a data write is being performed. When module 535 acts as a transmit module, the spread data would be transmitted over the bitline 513 to the module 536, which would be configured as a receive module to receive and process the spread data. The received spread data signal would be respread, using the same power spreading function, to provide the original data to the CPU.

It will be appreciated that not every element of a system will need to implement the power spreading techniques described herein. For example, the clock signal to provide the power spreading components 503 and 504 is illustrated as not being spread. Likewise, the control information between the CPU 505 and the memory is illustrated as not being spread, since control data is generally not high speed data.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein.

When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

What is claimed is:

1. A method comprising:
   receiving a first digital signal at a first device;
   outputting a second digital signal from the first device;
   modifying the first digital signal using a digital noise signal to generate a third digital signal;
   providing the first digital signal for output as the second digital signal in response to determining that the first digital signal does not comprise a power spread digital signal; and
   providing the third digital signal for output as the second digital signal in response to determining that the first digital signal comprises a power spread digital signal.

2. The method of claim 1, further comprising:
   comparing a sequence of bits of the first digital signal with a predetermined bit sequence to determine whether the first digital signal comprises a power spread digital signal.

3. The method of claim 1, wherein the first digital signal is representative of a clock signal.

4. The method of claim 1, wherein modifying the first digital signal comprises determining a synchronization signal based on the first digital signal and providing the synchronization signal to a locking element to produce the third digital signal.

5. The method of claim 1, further comprising:
   generating the digital noise signal using a pseudo-random number generator.

6. The method of claim 5, wherein the pseudo-random number generator comprises a Gaussian-random number generator.

7. The method of claim 5, wherein the pseudo-random number generator comprises a gated pseudo-random number generator.

8. The method of claim 7, wherein the gated pseudo-random number generator generates an even number of states.

9. The method of claim 5, wherein the pseudo-random number generator comprises a look-up table.

10. The method of claim 5, wherein the pseudo-random number generator comprises a linear feedback shift register.

11. A system comprising:
    a first device comprising:
       an input to receive a first digital signal;
       a modification module configured to modify the first digital signal using a first digital noise signal to generate a second digital signal;
       a detector module to configure a control signal to have a first state in response to determining the first digital signal is a power spread digital signal and to configure the control signal to have a second state in response to determining the first digital signal is not a power spread digital signal; and
       a multiplexer having a first input to receive the first digital signal, a second input to receive the second digital signal, and an output to provide a select one of the first digital signal or the second digital signal based on the control signal.

12. The system of claim 11, wherein the detector module comprises a sliding window detector module configured to compare a sequence of bits of the second digital signal with a predetermined bit sequence to determine whether the second digital signal comprises a digital signal having a substantially fixed frequency.

13. The system of claim 11, further comprising:
a pseudo-random number generator configured to provide the first digital noise signal.

14. The system of claim 13, wherein the pseudo-random number generator comprises a Gaussian-random number generator.

15. The system of claim 13, wherein the pseudo-random number generator comprises a gated pseudo-random number generator.

16. The system of claim 15, wherein the gated pseudo-random number generator generates an even number of states.

17. The system of claim 13, wherein the pseudo-random number generator comprises a look-up table.

18. The system of claim 13, wherein the pseudo-random number generator comprises a linear feedback shift register.

* * * * *